US006966123B1

(12) United States Patent
Rubino

(10) Patent No.: US 6,966,123 B1
(45) Date of Patent: Nov. 22, 2005

(54) MEASURING AID FOR MITERED PIECES AND KIT FOR SAME

(76) Inventor: Andrew Rubino, 5308 N. Oak Park Ave., Chicago, IL (US) 60656

( * ) Notice: Subject to any disclaimer, the term of this patent is extended or adjusted under 35 U.S.C. 154(b) by 0 days.

(21) Appl. No.: 10/898,821

(22) Filed: Jul. 26, 2004

(51) Int. Cl.$^7$ ................................................ G01B 3/00
(52) U.S. Cl. ............................ 33/770; 33/755; 33/758; 269/283
(58) Field of Search .......................... 33/758, 768, 760, 33/770, 755, 759, DIG. 1; 269/283–284, 269/258–259; 81/418, 421

(56) References Cited

U.S. PATENT DOCUMENTS

| 4,601,221 | A | * | 7/1986 | Kalkbrenner et al. ......... 81/418 |
| 4,673,174 | A | | 6/1987 | Tabbert |
| 4,747,588 | A | | 5/1988 | Dillhoff |
| 5,143,359 | A | * | 9/1992 | Bush ............................. 269/6 |
| 5,692,734 | A | | 12/1997 | Aldredge, Sr. |
| 6,226,885 | B1 | | 5/2001 | Korich |
| 6,367,787 | B1 | | 4/2002 | Poole et al. |
| 6,839,981 | B2 | * | 1/2005 | Rafter ........................... 33/770 |
| 2004/0221471 | A1 | * | 11/2004 | Graham ......................... 33/770 |

\* cited by examiner

Primary Examiner—G. Bradley Bennett
Assistant Examiner—Tania Courson
(74) Attorney, Agent, or Firm—Ryndak & Suri LLP; Vangelis Economou

(57) ABSTRACT

A securing device and method for assisting in the measurement of workpieces having mitered ends, including a clamp with two opposable arms for temporarily retaining the workpiece therebetween, including at least one arm extension providing a retaining edge to engage the distal end of a measurement tape at a reference point adjacent the distal end of a workpiece for measurement, the retaining edge receiving the end of a measurement tape allowing it to be withdrawn without slipping. A kit providing at least two of the arm extensions to be slidably attached over the arms of the clamp and providing a structure can retrofit a standard commercially available clamp, each of the mounting extensions include an arm receiving recess which can attach to the end of the arms of the clamp, the recess being shaped and configured to slidably engage the arm to hold the arm extension by interference fit.

12 Claims, 3 Drawing Sheets

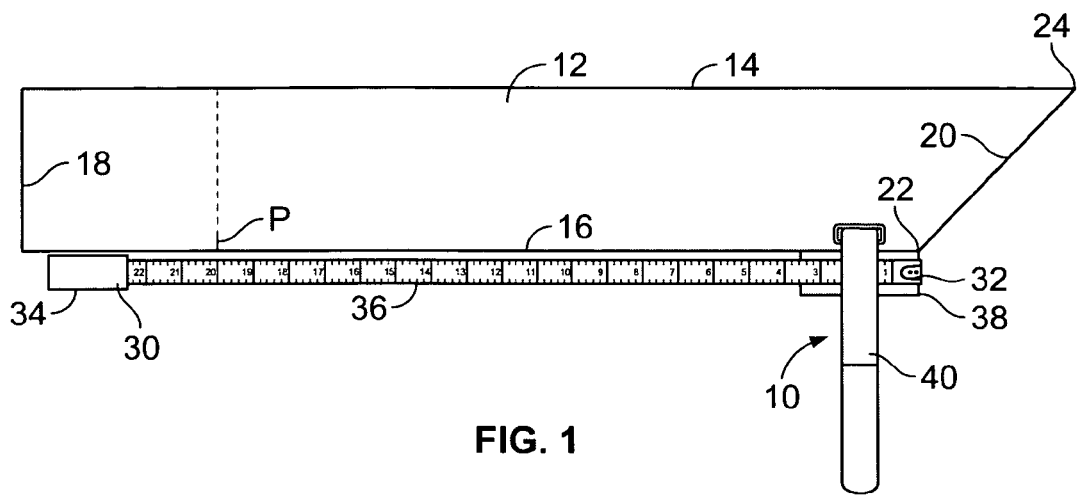
FIG. 1
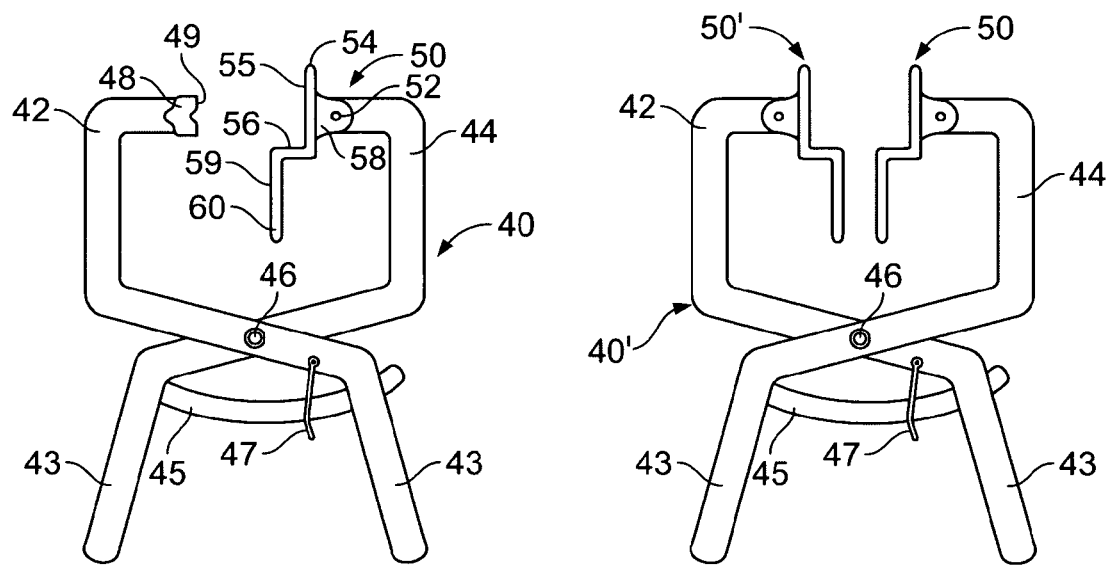
FIG. 2 FIG. 3

MEASURING AID FOR MITERED PIECES AND KIT FOR SAME

BACKGROUND OF THE INVENTION

1. Field of the Invention

The present invention relates generally to measuring devices and more particularly, to a measuring device for retaining and measuring the distal end of a mitered measuring means adjacent to a reference point on a mitered workpiece to enable a measuring of the length of the mitered workpiece is respective of the miter angle, and to an after market kit.

2. Background Art

Measuring operations are necessary in a wide variety of fields, and especially when working with tape measures, can be problematic. Accurate and easy measuring of workpieces is integral to the proper completion of most construction operations. One particular area that demands accurate, consistent, and expeditious measuring is in the field of carpentry.

Performing a measurement on a long workpiece, standard practice in carpentry is to employ a measuring means, such as a tape measure, to measure from a distal end of a workpiece to a length along the workpiece where a cut in the workpiece will produce the desired length. When the appropriate length measurement is reached, a mark is made on the workpiece to indicate the desired cutting location, and a cut is made at the mark.

The measurement of a workpiece of any substantial length provides some difficulty, because, as the length of a workpiece to be measured increases, so does the proportional difficulty in accurately, consistently, and rapidly measuring of the cutting length. When the workpieces are very long and the end of the work to be measured has a mitered edge, the distal end of the workpiece and the measuring means must of necessity be significantly distant from the proximal end of the workpiece, the main housing of the tape measure, and, of course, the person seeking to measure the workpiece.

Consequently, retaining the distal end of the measuring means adjacent to a reference point at the distal end of the workpiece can prove difficult and frustrating unless a two person team is used, one to hold the tape housing and the other to hold the end of the tape measure at the distal end. With the distal end of the measuring means beyond his or her reach, a single person seeking to measure a workpiece can find himself or herself helpless to prevent the end of the measuring means from slipping or becoming transposed from the reference point on the workpiece. Furthermore, a single person doing the measuring can be plagued with uncertainty as to whether the distal end of the measuring means is truly aligned with the desired reference point. Consequently, the length to which a workpiece is actually measured and cut can differ markedly from the intended length. In some cases, such a result can render the workpiece unusable scrap. In every case, however, the time spent usually by a two person team in measuring and cutting the workpiece is wasted and the user experiences at least some level of inconvenience.

To provide accurate measurements for lengthy workpieces, and even moreso when the workpieces are long and have a non-perpendicular end, for example, a mitered end, a two person team becomes necessary with one person at either end of the measuring tape. The first person holds the end of the tape measure against the edge or corner of the mitered joint, and the other person, separated by the length of the workpiece, pays out the tape measure until he or she reaches the mark for cutting may be made. Using a two person team for such measurements is counter-productive in that one worker must stop his activity in order to assist in the measurements. It is desirable that a single person be able to measure such workpieces efficiently.

Furthermore, even where a user is able to measure a workpiece to a desired cutting length, it becomes commonly more difficult to provide accurate measurements especially in the case where a miter cut is to be made to the end of a workpiece. In such situations, the end of one edge of the miter must be established and then a separate angular template issued to apply a cutting line to the workpiece with, for example, a pencil.

Attempts to provide some relief from the obstacles incumbent for the desire to effect an efficient and easy to implement solution to the measurement problems have proven to be somewhat cumbersome or expensive. For example, Korich, in U.S. Pat. No. 6,226,885, has proposed a measuring jig, which attaches to the free end of a tape measure to enable engagement of the tape measure hook end with the edge of the workpiece when the workpiece includes an angle or the end of the workpiece is mitered. Although the device taught by Korich is workable and provides the ability to measure workpieces having mitered ends, it requires that the tape measure include various connections, retaining arms, clips and other extra equipment that must be maintained by the worker so that it is available when needed. Thus, to the expense of obtaining such equipment and the requirement of an extra tape measure solely dedicated to the measuring jig, space is required on the worker's tool belt, which space is usually at a premium.

What has been found necessary is an easy to use, efficient and inexpensive measurement device and method for measuring workpieces having mitered ends. Ideally, such a device would be provided without requiring new equipment or additional expensive and cumbersome add-ons.

SUMMARY OF THE INVENTION

Accordingly, there is disclosed herein a securing device and method for assisting in the measurement of workpieces having a mitered end, the workpiece having a longitudinal direction and at least one distal end cut at an angle relative to the longitudinal direction, the securing device including a workpiece end engaging member, including a retaining mechanism to temporarily affix the workpiece end engaging member adjacent the end of the workpiece, comprising a pair of opposable arms, each arm having an opposing face, the arms being capable of being brought together and biased toward each other so as to clamp the lateral edges of a workpiece between them; and at least one arm extension, each arm extension attached to the end of one of said arms, the at least one arm extension providing a retaining edge, extending essentially normal to the longitudinal direction of the workpiece, for engaging the distal end of a measurement tape at a predetermined position adjacent the distal end of a workpiece, such that when the retaining mechanism of the workpiece end engaging member is temporarily clamped to the lateral edges adjacent the workpiece end engaging member at the angled distal end of the workpiece, the retaining edge is securely retained for receiving the end of the measurement tape thereby allowing the measurement tape to be drawn from its housing without slipping from the retaining edge.

In a second embodiment, a kit is disclosed for retrofitting any of a number of clamps or clamp arrangements that are capable of being utilized with any of a number of commercially available clamps. These clamp arrangements are specifically constructed and configured to be attachable onto the various clamp mounting plates of leading clamp manufacturers. The kit essentially comprises a pair of mounting extensions for attachment to the end of the arms of a clamp, at least one of the arm extensions providing a retaining edge, extending essentially normal to the longitudinal direction of the workpiece, for engaging the distal end of a measurement tape at a predetermined position adjacent the distal end of a workpiece, such that when the retaining mechanism of the workpiece end engaging member is temporarily clamped to the lateral edges adjacent the workpiece end engaging member at the angled distal end of the workpiece, the retaining edge is securely retained for receiving the end of the measurement tape thereby allowing the measurement tape to be drawn from its housing without slipping from the retaining edge. Preferably, each of the mounting extensions include an arm receiving recess which can attach to the end of the arms of the clamp, the recess being shaped and configured to slidably engage the arm so as to hold the arm extension by interference fit.

With the foregoing in mind, it becomes clear that a device presenting a solution to one or more of the aforementioned difficulties commonly experienced by those seeking to accurately measure a cutting line on a mitered workpiece or a workpiece having a compound angle would be useful. However, a device presenting a solution the aforementioned needs while providing a number of heretofore unrealized advantages would represent a marked advance in the art.

BRIEF DESCRIPTION OF THE DRAWINGS

FIG. 1 is a plan view of one embodiment of the invention being used with a mitered workpiece.

FIG. 2 is a side elevational view of the embodiment of the invention as shown in FIG. 1.

FIG. 3 is a side elevational view of another embodiment of the invention as shown in FIG. 1.

DETAILED DESCRIPTION OF THE PREFERRED EMBODIMENTS

Figure 4:
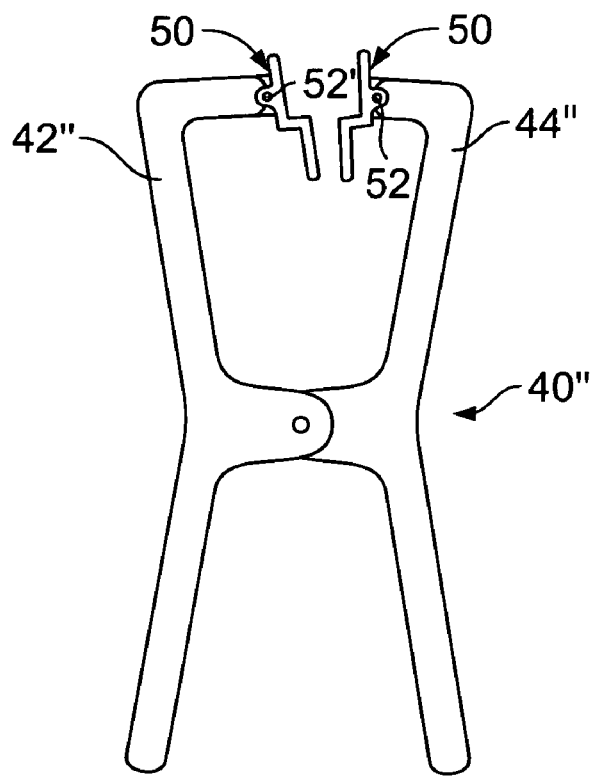
FIG. 4 is a side elevational view of another embodiment of the invention as shown in FIG. 1.

Referring now to FIG. 1, a retrofitted securing device 10 according to the present invention is shown in the process of performing a measurement on a workpiece 12. Workpiece 12 includes several edges, many of which are either parallel to each other or are mitered to present a beveled corner relative to each other. Workpiece 12 may comprise a piece of trim used in the finishing of a wall during construction, which is to be joined together at an edge in a corner as in a normal trim procedure. In such a case, the edge must necessarily be at a 45° angle as is shown in FIG. 1 if the corners are to square. For walls meeting at a different angle, the trim may be beveled at a different angle to accommodate the working angle of the joint.

The workpiece 12, for which measurement by this invention is intended, usually includes longitudinal edges 14 and 16, which are parallel to each other in a longitudinal direction, a distal edge 18, which may also be mitered or straight, as shown, and a mitered edge 20. The measurement must be made from one corner 22 of the intersection of the edges, for example, 20 and 16, or alternatively from the corner 24 intersection of edges 14 and 20. Since the corners must join up with a corresponding complimentary corner piece of an adjacent trim at a corner of a ceiling and wall, a 45° angle is required in between the miter so that the two pieces join together at a smooth 90° corner. If the corner is desired to be less than, or more than, 90° the miter angle will be changed to correlate and conform with the corner so that the joint becomes a smooth corner with the ends abutting each other.

Because of the angle of the miter edge 20, a hook 32 of a normal measuring tape 24 (FIG. 1) will not be able to hook onto the edge 20 of a mitered piece because it will slip off the edge as the worker is trying to work measure against this edge. What has been found to be necessary is a straight edge that is perpendicular to the longitudinal edges against which the hook can engage, and thereby provide a clear indication of the exact reference position of corner 22. It is also desirable that the straight edge be incrementally transposable to obtain an appropriate point for marking.

The securing device 10 provides such a right-angled straight edge against which a hook 32 of a standard tape measure 30 can engage and hook-up to so as to provide a measurement at a known reference point, such as point p shown in FIG. 1. The device 10 basically is an assembly measuring device that provides the ability to the worker to make measurement in the standard fashion. The first section of the device is a modified clamp 40 and the second is the tape measure 30 as shown in FIG. 1. In a preferred embodiment, the clamp 40 is a standard clamp modified by adding the inventive engagement members, as will be described below.

The tape measure is a standard tape measure in which a housing 34 provides a length of tape 36 having a hook 32 for engaging an edge of a material to be measured against. The clamp assembly 40 comprises a number of separate elements as will be explained below with reference to FIGS. 3–6 below. The function of the securing device for mounting on the clamp assembly is to clamp onto a section of the workpiece 12 so that the tape hook 32 can attach itself to a straight edge as shown in FIG. 1.

FIG. 2 shows a first embodiment of the invention including the clamp assembly and the retrofitted clamping member.

The measurement aid 40 illustrated in FIG. 2 is a clamp assembly including a standard clamp having two arms 42 and 44 pivotable about pivot point or axis 46, which can clamp to each other in such a way it can securely hold a clamped workpiece therebetween. As shown, a pawl 45 and ratchet 47 mechanism engage the handles 43 to maintain lateral pressure on the arms 42, 44 to maintain the clamping operation a workpiece being clamped. A clamping anvil 48 is provided on one of the arms to enable firm engagement with the workpiece being measured (FIG. 1). The inventive feature of the embodiment shown in FIG. 2 lies in an engagement member 50, comprising a pivotable mounting tab 58, which may be disposed on one or either side of the arms 42, 44, with a pivotable axis 52 attaching the pivotable each mounting tab 58 to the arm ends 42, 44.

As shown in profile in FIG. 2, the engagement member 50 comprises one mounting tab 58, which is attached to a flattened straight clamping section 54 having a surface 55 being essentially parallel to the face 49 of anvil 48. A right-angled connection section 56 connects the clamping section 54 with the measuring edge 59. Measuring section 59 comprises a second flattened surface that is in a plane parallel to the plane formed by the mounting section 54. The measurement section 59 has at least one longitudinally extending edge 60, and preferably two such edges as shown in the plane of the paper in FIG. 2, from which a hook from a tape measure can be engaged.

During use of the clamp 40, the clamp member is clamped onto the workpiece, for example, the workpiece 12 shown in FIG. 1, in which the narrow portion of the workpiece is clamped between the ends of the two arms 42 and 44 with the measurement section 59 and its edge 60 being aligned directly with the end corner 22 of the workpiece from which the measurement is to be taken. Thus the hook 32 of the tape measure 34 can easily engage the edge 60 of the measurement section 59, and thus be directly adjacent the point from which the measurement is required.

Additional embodiments of the measuring aid, such as aid 40' shown in FIG. 3, includes two engagement members 50, 50' that are oppositely disposed. As shown in FIG. 3, the second embodiment of aid 40' is shown having both of the arms 42 and 44 that include the oppositely disposed facing engagement of members 50, 50', with surfaces 55, 55' that are essentially parallel when the clamp of aid 40' is closed around a mitered piece to be measured. Because the basic clamping construction of the aid 40 (FIG. 2) is so similar to that of aid 40' (FIG. 3), like elements are identified by identical reference numerals, the differences only being discussed in detail herein.

The essentially parallel faces 55, 55' of the respective engagement members 50, 50' are capable of engaging a work piece without applying a concentrated pressure at a specific point, to avoid disfiguring or marring the surface of the workpiece being measured. Accordingly, the embodiments shown in FIGS. 2 and 3, and indeed all of the embodiments herein, have incrementally adjustable clamping capability so that the clamp provides only so much pressure on the workpiece as is necessary to maintain the engagement with the workpiece but not so much pressure as to disfigure the workpiece being measured. For example aids 40 and 40' include the pawl 45 and ratchet 47 mechanism for this purpose.

FIG. 4 is another embodiment of a measuring aid 40" in which a spring (not shown) is used to maintain pressure on the two clamping arms 42", 44", the ends of which include engagement member 50, 50', rotating about pivots 52, 52', as in the embodiments shown in FIGS. 2 and 3. The arms 42", 44" are biased toward each other by a strong spring disposed within and engaging the arms, made (not shown), as in standard hand clamps of this type. Preferably, the spring is made of spring steel.

Figure 5:
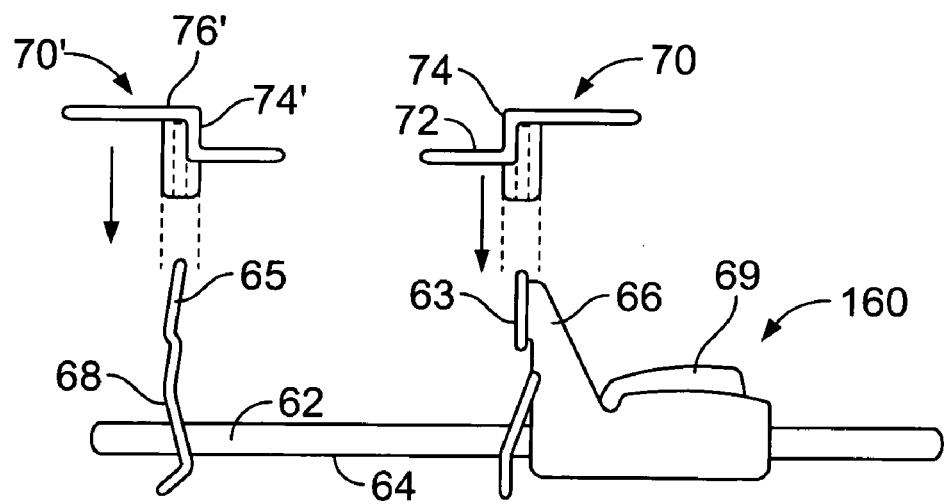
FIG. 5 is a partially exploded side elevational view of yet another embodiment of the invention.

In yet another embodiment, the measurement aid comprises a standard bar clamp, for example, such as bar clamp 160 manufactured by Adjustable Clamp Company of Chicago, Ill., and commercially sold under the name "Jorgensen MINI E-Z HOLD II." These types of clamps typically include an angled toggle action trigger for rectilinearly moving one end or engagement member of a clamp arm toward another end or engagement member, which is normally stationary, by incremental divisions. As shown in FIG. 5, bar clamp 160 includes a steel bar 62 having one edge 64 that is serrated so that the movable engagement member 66 can utilize the serrations or teeth to incrementally move the one arm 66 toward the other stationary arm 68 by action of the toggle action trigger 69. Alternatively, the edge 64 need not be serrated, but an interference fit maintains engagement of the edge 64 against the toggle action trigger 69, as shown. The details of the toggle action trigger 69 will not be discussed in detail here, since these types of clamps are well known in the building trades and other fields. The serrations may not be necessary, as is described below with respect to the embodiment of FIG. 6.

The inventive improvement, and a feature of present invention, is the pair of engagement attachments 70, 70'. These attachments 70, 70' may be identically symmetrical so that each can be utilized on either the stationary or the movable arm. Similar to the engagement members 50, 50' of the embodiments shown in FIG. 3, the engagement attachments 70, 70', shown in FIG. 5 one of which is shown in the detail view in FIG. 7, are oppositely disposed. As shown in FIG. 5, the measurement aid 160 is shown having both of the arms 66 and 68 to include the oppositely disposed ends 63, 65 providing a mounting means for the members 70, 70', so that, when mounted, faces 74, 74' are essentially parallel to each other to enable facing engagement of the clamp of aid 160 to close around the lateral edges of a mitered piece to be measured. Because the basic clamping construction of the aid 60 (FIG. 5) is so similar to that of aid 80 (FIG. 6), like elements are identified by identical reference numerals, the differences only being discussed in detail herein.

One of the features and distinct advantages of the invention is that the structure of the engagement members 50, 50' etc. can easily be provided as a kit for retrofitting over standard commercially available clamps, as is described above. That is, the sections of the engagement members that fit over the clamp arms. This feature provides the ability to take advantage of the salient features of the invention without requiring the purchase of a separate tool, but can utilize a standard clamp for woodworking use, which is most likely already in the toolbox or on the tool belt of a carpenter who is likely to require the inventive features of the measurement aid, as a base to attach the invention thereto to enable easy one person measurement of mitered work pieces. Another feature and advantage of the invention is that it can measure from any desired point on any kind of mitered end, including compound miters (not shown), as long as the two surfaces are available for the attachments 70, 70' to engage and thereby provide a reference point for measurement.

Referring again to FIG. 5, and also to FIG. 7, a single engagement member 70 is illustrated. It should be understood, however, that the structural and operational principles of the engagement attachments 70, 70', will be applicable to the other embodiments, for example, members 50, 50'. Thus, the discussion below is provided for illustrative purposes only, and is not limited thereto.

As discussed above, the engagement attachments 70 may be identical, except for their orientation, to the attachments 70', likewise engagement members 50 and 50' (FIG. 3) may be identical. Thus, only one engagement attachment 70 is illustrated in FIG. 7, with the understanding that changing orientation by rotating the member 70 around a vertical axis to an angle of 180° will also describe the engagement attachment 70'.

Engagement 70 comprises a surface 74 (surface 74' in attachment 70' in FIG. 5), which is preferably parallel in orientation to the engagement surface 82 (FIG. 6) of the measurement aid 80, that is, to the surface 82 of the clamp arm end. This is important in providing a solid grip on the workpiece, since the surface of the workpiece is in contact therewith, as shown in FIG. 1.

A second supporting surface 72 is at right angles to the surface 74, and provides a stop to abut against a lateral edge of the workpiece, and also to make the edges 78 of the measurement attachment 70 square to the longitudinal edge 16 of the workpiece 12 (FIG. 1). Thus, the two surfaces 72, 74 each abut at least two surfaces and/or edges of the workpiece 12, thereby providing frictional contact therewith, and also the attachment 70 provides a steady surface or edge 78 against which a hook from tape measure can be supported without slipping off. Moreover, as shown in FIGS. 3–6, the pair of engagement members 50, 50' or attachment members 70, 70', each include a connection mechanism that will firmly connect the attachments 70, 70' to the respective arm ends of the clamp.

The essentially parallel faces 74, 74' of the respective engagement members 70, 70' are capable of engaging the lateral edges of a work piece without applying a concentrated pressure at a specific point, to avoid disfiguring or marring the surface of the workpiece being measured. As in the embodiments shown in FIGS. 2 and 3, the aids 60, 80 have incrementally adjustable clamping capability so that the clamp provides only so much pressure on the workpiece as is necessary to maintain the engagement with the workpiece but not so much pressure as to disfigure the workpiece being measured.

Figure 6:
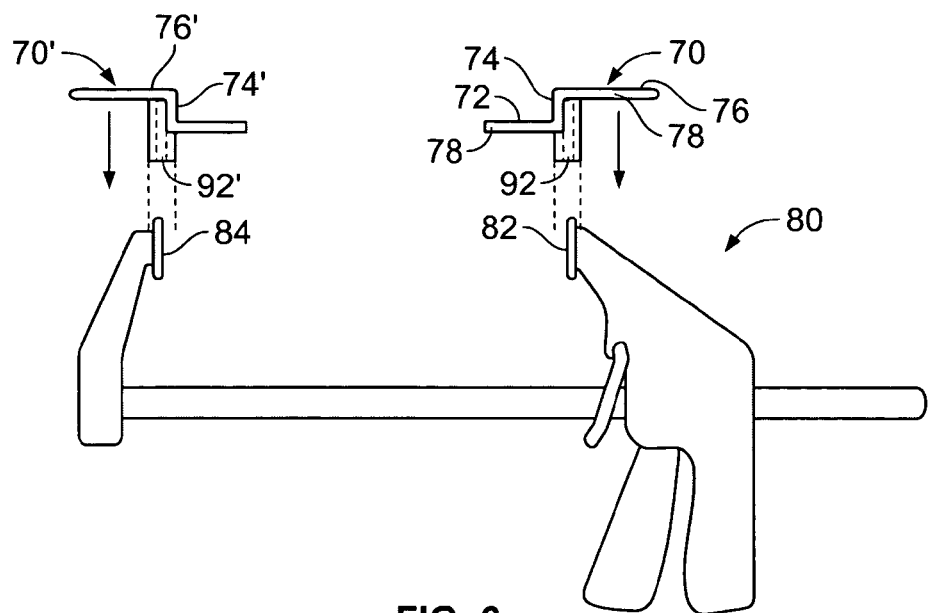
FIG. 6 is a partially exploded elevational side view of yet another embodiment of the invention.
Figure 7:
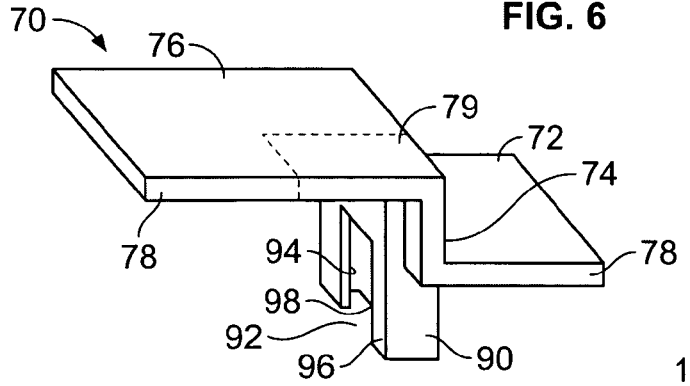
FIG. 7 is a perspective view of one embodiment of a clip-on engagement member similar to that illustrated in FIGS. 5 and 6.

As shown, the connection mechanism for attaching the attachments 70, 70' to the clamp arm ends, for example, ends 63, 65, is a slot that is shaped and configured to correspond to specific and predetermined shape of the clamp arm ends, which are received in substantially enclosed receptacle 90 comprising of a slotted recess 92, having dimensions that permit the mounting of the receptacle over a clamp arm end, as shown in FIGS. 5 and 6. The receptacle 92, shown in phantom in FIGS. 5 and 6, has a depth that is about the same dimension, or slightly larger, than the expected thickness of the arm end of a specific clamp, so that mounting of the attachment 70 over the arm end provides an interference fit therebetween. Additionally, the widths can also correspond so that the mounting will be square and provide a further interference fit.

Surface 76 is also provided on the measurement attachment 70, to extend away from surface 74 in the opposite direction from surface 72 and above the recess 90, but this surface is not essential to the structure or operation of the measurement aids described herein, and is provided as an aid to retaining and supporting the hook of the tape measure during the measurement step. The edge 78 provides a resting surface for the hook to attach to, so that the edge is essentially perpendicular to the direction of the measurement. The extension of edge 78 is shown to be substantial, so as to provide a wide working surface for the hook to attach. Alternatively, the edge 78 extending away from the surface 74 may be as wide as a standard tape measure.

The recess 90 is defined by a back wall 94 and a slotted front wall 96, a slot 98 in the front wall 96 providing leeway for the extension of the clamp arm so as to enable it to project to the support provided by the clamp arm end on which the attachments 70, 70' are mounted. Other alternate features may be provided to provide a more efficient operation and ease of attachment of the hook to the edge 78. For example, a magnetic or magnetized surface 79, shown in phantom, disposed at the edge 78 may be used to attract and more easily retain the hook of the tape measure.

Figure 8:
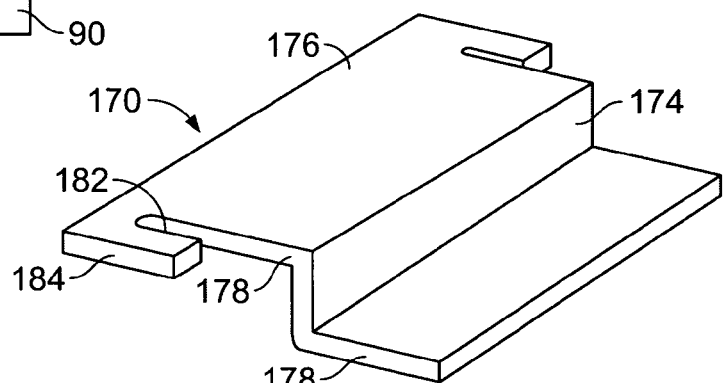
FIG. 8 is another embodiment of an engagement member according to the present invention.
Figure 9:
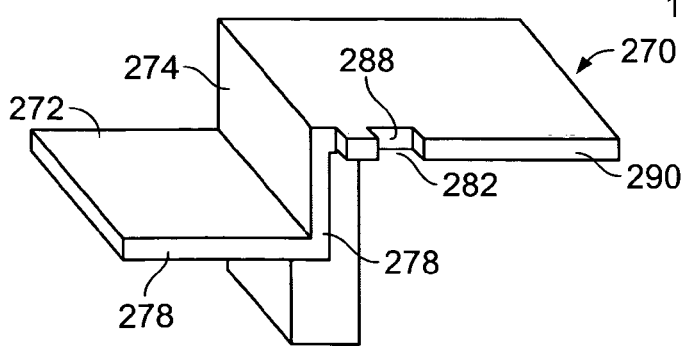
FIG. 9 is yet another embodiment of an engagement member according to the present invention.

Additional alternative configurations for the attachment are shown in FIGS. 8 and 9. Attachment 170, illustrated in FIG. 8, is essentially identical to the attachment 70, except that the surface 176 includes a hook retention slot 182, into which the hook end may be inserted. A finger 184, together with edge 178, define the slot 182, and the slot 182 is deep enough to receive the thickness of the hook of a tape measure. The width may be predetermined to provide a snug interference fit so as to retain the hook in the slot 182 during the measurement operation.

Attachment 270, illustrated in FIG. 9, similarly has a cut out recess 282, which is wide enough to receive a hook from a tape measure, and the width of recess 82 may be predetermined to also provide a tight interference fit to retain a standard width of a hook in place during measurement. The measurement procedure for using the measurement attachment 270 is slightly different than that of the other attachments. That is, whereas the edges 78, 178 of FIGS. 6 and 7 may be lined up with the end of the workpiece from which the measurement is taken with respect to the above described embodiments, it is the secondary edge 288, or the bottom surface of the recess from which the measurement tape hook is attached and from which the tape extends, that acts as the measurement reference point in the embodiment of FIG. 9. To make the lining up process easier, the edge 278 which borders the surfaces 272, 274 that are adjacent the workpiece, also are disposed at the same depth or distance from the edge 290 as is the surface 288. Thus, lining up the edge 278 with the measurement reference point will also provide the same reference point against which the tape hook is measured.

This invention has been described with reference to the above disclosed embodiments. Modifications and alterations of the disclosed embodiments are within the ability of persons having ordinary skill in the construction industry once a full understanding of the invention is achieved, and this invention is not intended to be limited to the description of the disclosed embodiments, the invention being limited only by the following claims and equivalents thereof.

What is claimed is:

1. A securing device for assisting in the measurement of a workpiece, the workpiece having a longitudinal direction and at least one distal end cut at an angle relative to the longitudinal direction, the securing device comprising:

a workpiece end engaging member, including a retaining mechanism to temporarily affix the workpiece end engaging member adjacent the distal end of the workpiece, the workpiece end engaging member comprising a pair of opposable arms, each arm having an opposing face, the arms being capable of being brought together and biased toward each other so as to clamp the lateral edges of a workpiece between them; and at least one arm extension attached to the end of one or both of said arms, the at least one arm extension having a first connection section and a second connection section, connected to one end of said first section and extending essentially perpendicularly away therefrom, each said section having a workpiece engaging surface for contacting at least two surfaces of the workpiece, and a measuring section extending essentially perpendicularly away from another end of said first connection section for providing a retaining edge extending essentially normal to the workpiece engaging surfaces for engaging the distal end of a measurement tape at a predetermined position adjacent the distal end of a workpiece, such that when the retaining mechanism of the workpiece end engaging member is temporarily clamped to the angled distal end of the workpiece, the retaining edge serves to indicate a reference point of the workpiece, and the retaining edge is securely affixed for receiving the end of the measurement tape, thereby allowing the measurement tape to be drawn from its housing without slipping from the retaining edge.

2. The securing device for assisting in the measurement of a workpiece according to claim 1 wherein the at least one arm extension further comprises an arm attachment portion and a workpiece surface securing portion, the arm attachment portion including a recess for providing an attachment to the end of the arm opposing face, thereby permitting measurement of the longitudinal dimension of the workpiece to be measured by one user using the measurement tape.

3. The securing device for assisting in the measurement of a workpiece according to claim 2 wherein the recess is shaped and configured to slidably engage the arm opposing face so as to hold the arm extension by interference fit.

4. The securing device for assisting in the measurement of a workpiece according to claim 3 wherein one of the workpiece engaging surfaces is parallel to the opposing face of the arm and another of the surfaces is an intersecting surface that is essentially perpendicular to the opposing face of the arm extension, so as to form a corner along the longitudinal direction of the workpiece for engaging the workpiece at the least at two surfaces thereof.

5. The securing device for assisting in the measurement of a workpiece according to claim 3 whereby when the opposing faces of the retaining mechanism are shaped and configured so that when they are brought toward each other, they engage the workpiece, and when the at least one arm extension is brought toward the opposing face of the retaining mechanism, the faces are biased toward each other by the compression force exerted by the workpiece end engaging member.

6. The securing device for assisting in the measurement of a workpiece according to claim 5, the retaining mechanism of the workpiece further comprising a longitudinally extending bar to which each of the arms are attached, the at least one arm extension opposing face extending in a direction essentially perpendicular to the longitudinal direction of the bar, at least one of the arms and the associated arm extensions being movable along the bar toward the other opposing face of the retaining mechanism, the opposing faces of the arm extension engaging opposite longitudinal surfaces of the workpiece and the arm being biased against the workpiece by the compression force exerted onto the bar by at least one workpiece arm extension.

7. The securing device for assisting in the measurement of a workpiece according to claim 1 wherein the workpiece end engaging member for engaging a distal end of a workpiece further comprises a base member, an arm having an end face engaging surface fixed relative to and projecting outwardly from the base member for engaging a surface of a workpiece, and a rear longitudinal face engaging surface fixed relative to and projecting from the base member for engaging a rear longitudinal surface of a workpiece, wherein the end face engaging surface and the rear longitudinal face engaging surface together define a clamping mechanism for receiving and engaging a distal end of a mitered workpiece; and wherein the end face engaging surface is fixed at an acute angle relative to the rear longitudinal face engaging surface, whereby the end face engaging surface and the rear longitudinal face engaging surface together define a V-shaped angular corner between the end face engaging surface and the rear face engaging surface and whereby the end face engaging member can be disposed to contact a mitered end of a workpiece with the end face engaging surface engaging a mitered end face of a workpiece and the rear longitudinal face engaging surface engaging a rear longitudinal face of a workpiece to provide the angular corner.

8. The securing device for assisting in the measurement of a workpiece according to claim 1 wherein the at least one arm extension further comprises two arm extensions, each arm extension attached to the end of one of said arms, at least one of the arm extensions providing a retaining edge, the retaining edge extending essentially normal to the longitudinal direction of the workpiece, for engaging the distal end of a measurement tape at a predetermined position adjacent the distal end of a workpiece, such that when the two arm extensions are temporarily brought toward each other with the longitudinal edges of the workpiece therebetween, the retaining edge is securely retained at the predetermined position adjacent the distal end of a workpiece, and is ready for receiving the end of the measurement tape thereby allowing the measurement tape to be drawn from its housing without slipping from the retaining edge.

9. The securing device for assisting in the measurement of a work piece according to claim 1 wherein the at least one arm extension includes a magnetic material adjacent the retaining edge.

10. A retrofit kit for assisting in the measurement of a workpiece, the workpiece having a longitudinal direction and at least one distal end cut at an angle relative to the longitudinal direction, the kit comprising at least one arm extension, each arm extension being attachable to the end of one arm of a clamp, the at least one arm extension providing a first connection section and a second connection section, connected to one end of said first section and extending essentially perpendicularly away therefrom, each said section having a workpiece engaging surface for contacting at least two surfaces of the workpiece, and a measuring section extending essentially perpendicularly away from another end of said first connection section for providing a retaining edge, extending essentially normal to the workpiece engaging surfaces, for engaging the distal end of a measurement tape at a predetermined position adjacent the distal end of the workpiece, such that when the retaining mechanism of the clamp is temporarily clamped to the lateral edges adjacent the clamp at the angled distal end of the workpiece, the retaining edge is securely retained for receiving the end of the measurement tape, thereby allowing the measurement tape to be drawn from its housing without slipping from the retaining edge without further assistance form the user.

11. The securing device for assisting in the measurement of a work piece according to claim 10 wherein the at least one arm extension includes a magnetic material adjacent the retaining edge.

12. A securing device for assisting in the measurement of a workpiece, the workpiece having a longitudinal direction and at least one distal end cut at an angle relative to the longitudinal direction, the securing device comprising:
   a workpiece end engaging member, including
   a bar having a longitudinal dimension at least as long as the width dimension of the workpiece when measured transverse to the longitudinal direction, and
   a retaining mechanism to temporarily affix the workpiece end engaging member adjacent the distal end of the workpiece, the workpiece end engaging member comprising a pair of opposable arms, each arm having an opposing face, the arms being capable of being brought together and biased toward each other so as to clamp longitudinally extending edges of the workpiece between them; and one arm extension attached to the end of at least one of the pair of said arms, the at least one arm extension having a first connection section and a second connection section, connected to one end of said first section and extending essentially perpendicularly away therefrom, each said section having a workpiece engaging surface for contacting at least two surfaces of the workpiece, and a measuring section extending essentially perpendicularly away from another end of said first connection section for providing a retaining edge extending essentially normal to the workpiece engaging surfaces for engaging the distal end of a measurement tape at a predetermined position adjacent the distal end of the workpiece, such that when the retaining mechanism of the workpiece end engaging member are temporarily clamped to the angled distal end of the workpiece, the retaining edge serves to indicate a reference point of the workpiece, and the retaining edge is securely affixed for receiving the end of the measurement tape thereby allowing the measurement tape, to be drawn from its housing without slipping from the retaining edge.

* * * * *